April 4, 1961
M. N. MILLER ET AL
2,977,978
RELIEF VALVE
Filed Nov. 25, 1957
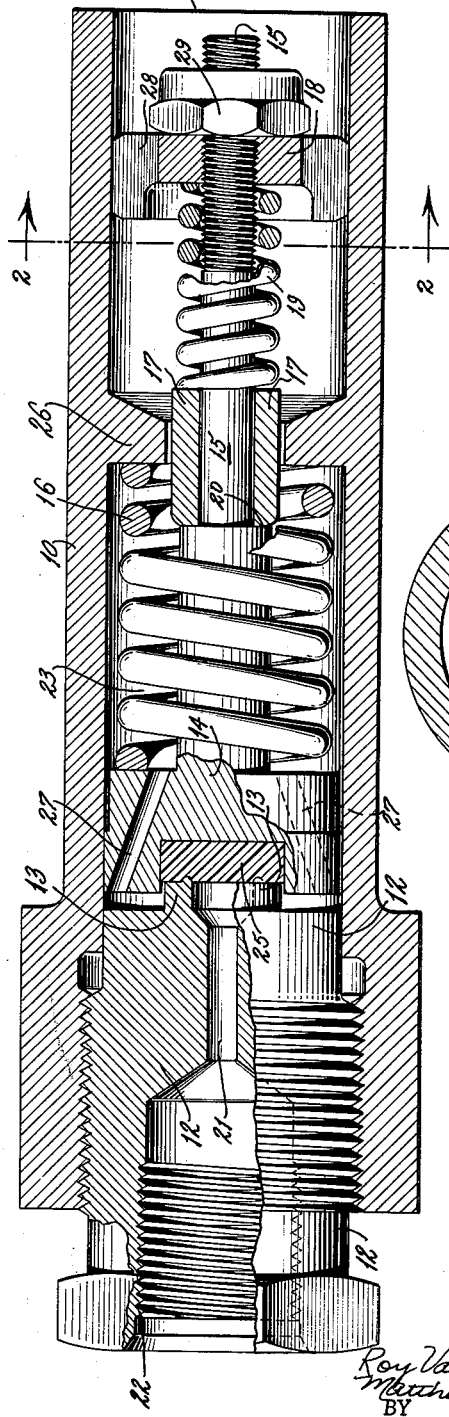
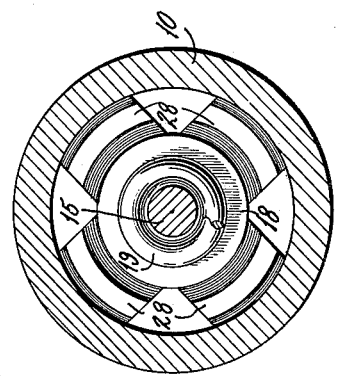
INVENTORS
Roy Valentine Smith &
Matthew Ned Miller
BY
Brumbaugh, Free, Graves & Donohue

United States Patent Office 2,977,978
Patented Apr. 4, 1961

2,977,978

RELIEF VALVE

Matthew Ned Miller, Topanga, and Roy Valentine Smith, Los Angeles, Calif., assignors to Fairchild Engine and Airplane Corporation, Hagerstown, Md., a corporation of Maryland Filed Nov. 25, 1957, Ser. No. 698,617

8 Claims. (Cl. 137—470)

This invention relates to relief valves generally and, more particularly, to a quick-closing relief valve having a high degree of sensitivity.

The relief valve of the present invention includes a variable restricted passage interposed between the relief valve and the discharge opening thereof. When the pressure of the fluid which is to be regulated exceeds the critical pressure, the relief valve is forced open against a bias which urges it toward closed position, and the flow of fluid through the restricted passage brings about an increase in the size or effective cross-sectional area of the passage, permitting a high rate of flow of fluid through the relief valve. However, when the pressure of the regulated fluid decreases, the size or effective cross-sectional area of the passage decreases, building up the pressure on the downstream side of the relief valve, so that biasing means acting on the valve will be capable of re-seating the valve at a pressure very close to the critical relief pressure. The pressure relief valve of this invention is capable of re-seating at a pressure exceeding 98.5% of the critical relief pressure.

More specifically, the relief valve of the present invention is accommodated within a valve housing between inlet and discharge openings, and the relief valve is spring biased to closed position. A restricted passage is formed within the valve housing between the valve and the discharge opening. This restricted passage is defined between fixed and movable elements, the movable element being connected by a resilient coupling to the valve. When the critical relief pressure of the valve is attained, the valve is unseated, permitting a flow of fluid through the restricted passage to the discharge opening of the valve housing. When the valve is opened and flow occurs, the pressure drop across the restricted passage tends to separate the movable and fixed elements, thereby increasing the size of the restricted passage. As the inlet pressure of the fluid decreases, the valve moves toward its closed position, but since the flow of the fluid through the housing is still maintained, the movable element tends initially to remain in displaced position relative to the fixed element. Ultimately, however, this movement of the valve acts through the said resilient coupling to reduce the separation between the fixed and movable elements, thereby reducing the effective cross-sectional area therebetween. This, in effect, results in a throttling action downstream of the valve which tends to equalize the pressures on opposite sides of the valve, permitting the spring which normally biases the valve to closed position to move the valve against its valve seat.

For a complete understanding of the present invention, reference may be made to the detailed description which follows, and to the accompanying drawings in which:

Figure 1 is a side view, partly in cross-section, of the relief valve of the present invention; and Figure 2 is a cross-sectional view, taken along the line 2—2 of Figure 1, looking in the direction of the arrows.

Referring to Figure 1 of the drawings, the pressure relief valve of the present invention comprises a housing 10 having a plug 12 threadably coupled thereto at one end, a valve seat 13 formed on the inner end of the plug 12, a movable piston-type valve 14 having a stem or rod 15 extending from the downstream side thereof, a spring 16 normally biasing the valve 14 to closed position against the valve seat, a movable sleeve 17 supported for sliding movement on the rod or stem 15, a guide element 18 affixed to the stem 15 at a point remote from the valve for the support of the stem, and a compression spring 19 interposed between the guide 18 and the movable sleeve 17 which acts to urge the opposite end of the sleeve into engagement with a shoulder 20 of the stem.

The plug 12 contains an inlet passage 21 therethrough. The upstream end of the passage 21 is of larger diameter than the downstream end thereof, and it is internally threaded at 22 to permit the relief valve to be threadably coupled to an externally threaded nipple by means of which the inlet passage of the relief valve is in communication with the fluid whose pressure is to be controlled. The downstream end of the inlet passage 21 is in communication with a passage or chamber 23 which extends through the housing 10 to the discharge opening 24 of the housing. The valve seat 13 surrounds the downstream end of the opening 21.

The valve 14 is slidably movable within the passage 23 toward and away from the valve seat. The outer periphery of the valve forms a close fit with the inner periphery of the housing, so that the valve is guided thereby in its movements toward and away from the valve seat. A pad 25 of resilient material, for example, rubber or a plastic, such as Teflon, is set into the end of the valve to provide an effective, leak-proof seal when the valve is in closed position.

A constriction is formed within the passage 23 between the valve 14 and the discharge opening 24 by an inwardly projecting formation 26 formed integrally with the interior of the housing 10. The upstream side of the constricting formation serves as a retaining wall for the compression spring 16 which acts against the downstream side of the valve to urge it toward the valve seat. Passages 27 are formed through the valve in the vicinity of the outer periphery thereof, so that when the valve is unseated the fluid will be permitted to flow through these passages in moving from the upstream to the downstream side of the valve.

When the valve is seated, the sleeve 17 is interposed within an opening through the constriction formation 26. The sleeve 17 is an annular element of greater outside diameter than the stem 15. Therefore, a restricted passage is defined between the constriction formation and the sleeve. The length of the sleeve is such that appreciable movement of the valve away from its valve seat is possible without displacing the sleeve from within the constriction. However, as the pressure drop across the constriction increases, the sleeve tends to move away from the valve, that is to say, to the right as viewed in Figure 1, against the action of the spring 19. When this pressure drop is sufficiently high, the tapered upstream end of the sleeve will ultimately be displaced far enough to move it entirely out of the opening formed by the constriction, thereby increasing the size or effective cross-sectional area of the passage defined therebetween.

The fluid flowing through the variable restricted passage is discharged from the housing through the open end 24 thereof. The flow of fluid through the guide element 18 is permitted by radial slots 28 formed in the outer periphery thereof. The guide element 18 is threadably coupled to the end of the stem 15, and it is locked thereon by a retaining nut 29, also threaded onto the end of the stem. Thus, the guide 18 is movable as part of the valve and valve stem. However, it can be adjusted relative thereto to adjust the pressure exerted by the spring 19 on the movable sleeve 17.

In operation, when the critical relief pressure of the valve is reached and the valve is unseated, the fluid flows through the passage 23 and the restricted passage formed between the sleeve 17 and constriction formation 26 to the discharge end of the housing. When this flow occurs, the pressure drop across the restricted passage displaces the sleeve 17 in a downstream direction against the action of the spring 19. If the pressure drop across the restricted passage is high enough, the sleeve is moved to a position offset in a downstream direction from the constriction, thereby increasing the size or effective cross-sectional area of the restricted passage, permitting a high rate of flow of the fluid through the relief valve housing.

In re-seating, the valve moves toward its closed position as the inlet pressure of the flluid decreases. While the rate of flow of fluid through the restricted passage is high, the sleeve remains displaced from the constriction formation. However, in view of the fact that the spring-retaining guide element 18 moves with the valve, a greater force is exerted on the sleeve 17 to urge it toward the constriction. As the pressure drop across the restricted passage continues to drop, the effective cross-sectional area of the restricted passage decreases until the sleeve is once more interposed within the constriction. The decrease in the size of the restricted passage results in a throttling action downstream of the relief valve which tends to equalize the pressures on opposite sides of the valve. Although the pressures on opposite sides of the relief valve are never fully equalized, a much greater sensitivity in re-seating is obtained because these pressures tend to equalize and thereby reduce the force which is acting upon spring 16 to compress it.

The invention has been shown in preferred form and by way of example only, and obviously many variations and modifications may be made therein without departing from the spirit of the invention. The invention, therefore, is not to be limited to any specified form or embodiment, except in so far as such limitations are set forth in the claims.

We claim:

1. A pressure relieving apparatus comprising means defining a passage, the inlet end of which is in communication with a source of fluid under pressure, a relief valve within said passage, biasing means for said relief valve for urging the relief valve to closed position, cooperating relatively movable means defining a variable restricted passage therebetween downstream of said relief valve, the pressure drop across the restricted passage produced by the flow of fluid therethrough when the relief valve is open exerting a force between said relatively movable means which tends to increase the size of said restricted passage, means exerting a bias on said relatively movable means which tends to reduce the size of the variable passage, and means controlled by the movement of the relief valve toward closed position for increasing the bias on said relatively movable means, whereby as the pressure of the fluid decreases from a value higher than the relief pressure to a value very close to the relief pressure, the movement of the relief valve toward closed position tends to initiate a reduction in the size of the variable restricted passage downstream of said relief valve to produce a throttling action which tends to build up the pressure on the downstream side of the relief valve, affording a greater sensitivity in re-seating since the means which normally biases the relief valve to closed position will exert almost the same control on the relief valve during re-seating that it exerted upon opening.

2. A reliev valve comprising a valve housing having inlet and discharge openings and a passage therethrough between the inlet and discharge openings, a valve seat within the valve housing, a movable valve, biasing means to urge the valve against its valve seat, thereby preventing flow through the housing from the inlet to the discharge openings, means movable within the passage between the inlet and discharge opening and downstream of the valve, means fixed within said passage and cooperating with the movable means to define a restricted passage therebetween for the flow of fluid through the housing, and a resilient connection between the valve and the movable means, the arrangement being such that the pressure drop through the restricted passage produced by the flow of fluid therethrough when the valve is open serves to increase the size of the restricted passage, and the resilient coupling between the valve and the movable means tends to reduce the size of the restricted passage, whereby as the pressure of the fluid decreases from a value higher than the relief pressure to a value very close to the relief pressure, the movement of the valve toward closed position tends to initiate a reduction in the size of the variable restricted passage downstream of said valve to produce a throttling action which tends to build up the pressure on the downstream side of the valve, affording a greater sensitivity in reseating since the means which normally biases the valve to closed position will exert almost the same control on the valve during re-seating that it exerted upon opening.

3. A relief valve comprising a valve housing having inlet and discharge openings and a passage therethrough between the inlet and discharge openings, a movable valve therein, biasing means to urge the valve to closed position, a movable element within said passage downstream of said valve, means cooperating with the movable element to form a variable restricted passage therebetween, the pressure drop across the restricted passage produced by the flow of fluid therethrough when the relief valve is open exerting a force on said movable element which tends to displace it from said cooperating means within the passage to increase the size of the passage, and a resilient coupling between the movable element and the valve which exerts a force on said movable element which tends to reduce the size of the restricted passage when the valve is moved toward closed position.

4. A relief valve as set forth in claim 3 including a stem extending downstream of said valve for the support of said movable element.

5. A relief valve as set forth in claim 4 wherein the resilient coupling is an extensible spring accommodated on said stem and including a spring-retaining means carried by said stem.

6. A relief valve as set forth in claim 5 including a stop carried by said stem toward which the movable element is urged by the extensible spring acting against it.

7. A relief valve comprising a valve housing having inlet and discharge openings and a passage therethrough between the inlet and discharge openings, a valve seat within the valve housing, a piston-type valve movable within the said passage toward and away from the valve seat, an elongated stem extending downstream of the valve, means forming a constriction within said passage downstream of said valve, an expansible spring interposed between said constriction and said valve for urging said valve closed, guide means connected to said stem downstream of said constriction-forming means, a sleeve slidably mounted on said stem, a stop carried by said stem, said stop being upstream of said constriction-forming means when the valve is in closed position, an expansible spring interposed between said sleeve and said guide means to urge the sleeve toward said stop, whereby the outer periphery of the sleeve and the inner periphery of the constriction-forming means define a restricted passage therebetween, the effective size of which increases as the pressure drop across the restricted passage increases, and whereby the movement of the valve toward closed position tends to increase the force on the sleeve which tends to move it in a direction to reduce the size of the restricted passage.

8. A pressure relieving apparatus comprising a relief valve normally biased to closed position, relatively movable means defining a variable restricted passage downstream of said relief valve, means defining a flow passage from the relief valve to the variable restricted passage to direct substantially the entire flow of fluid passing through said relief valve to the variable restricted passage, said relatively movable means including a pair of relatively movable elements which cooperate to control the pressure in the flow passage, said two elements cooperating to define a restricted passage of relatively small cross-sectional area when the relief valve is closed and a larger passage when the relief valve is open, and means for exerting a force on said relatively movable means which tends to maintain the effective size of the variable passage small, the high pressure of the fluid forcing open the relief valve and increasing the size of the restricted passage to afford a higher rate of flow through the relatively large opening of the variable passage, and a fall in pressure reducing the size of the restricted passage to afford a lower rate of flow through the smaller opening to permit the pressure to build up on the downstream side of the valve before the valve closes.

References Cited in the file of this patent

UNITED STATES PATENTS

| | | |
|---|---|---|
| 306,208 | Ashton et al. | Oct. 7, 1884 |
| 2,306,012 | Campbell | Dec. 22, 1942 |
| 2,500,156 | Dechant | Mar. 14, 1950 |
| 2,501,730 | McClure | Mar. 28, 1950 |